(No Model.)

S. E. S. CHAPLEAU.
NUT LOCK.

No. 257,290. Patented May 2, 1882.

Attest.
Sidney P. Hollingsworth
Newton Wyckoff.

Inventor.
Samuel E. S. O. Chapleau
By his atty.
Philip T. Dodge.

UNITED STATES PATENT OFFICE.

SAMUEL E. ST. O. CHAPLEAU, OF OTTAWA, ONTARIO, CANADA.

NUT-LOCK.

SPECIFICATION forming part of Letters Patent No. 257,290, dated May 2, 1882.

Application filed January 26, 1882. (No model.)

*To all whom it may concern:*

Be it known that I, SAMUEL E. ST. O. CHAPLEAU, of Ottawa, in the county of Carleton and Province of Ontario, Canada, have invented certain Improvements in Nut-Locks, of which the following is a specification.

This invention relates to a device designed more particularly for use in connection with the bolts arranged in pairs for securing fish-plates or coupling-bars to railroad-rails.

The invention consists in the peculiar construction of the plate, as hereinafter detailed, whereby it is adapted for application to previously applied nuts without the necessity of removing them.

Figure 1:
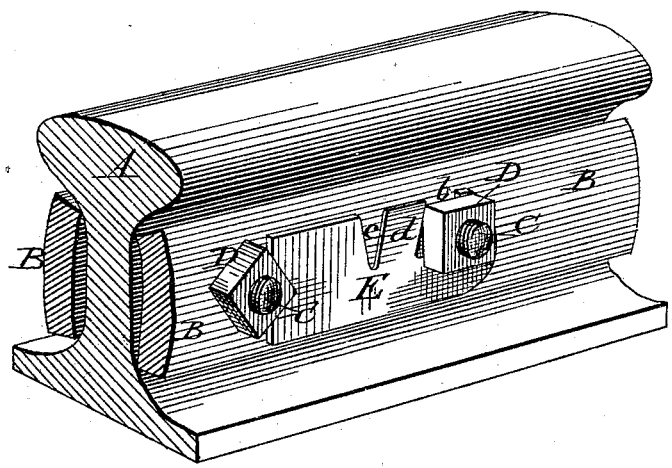
Figure 2:
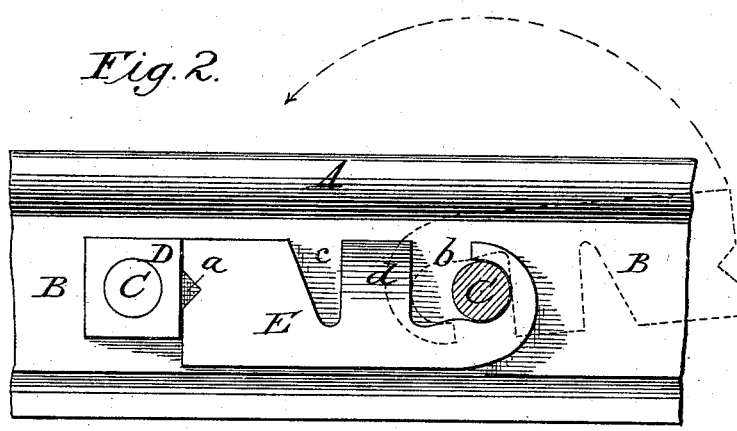

Referring to the accompanying drawings, Figure 1 is a perspective view of my device in use. Fig. 2 is a side elevation of the same in its operative position, one of the nuts being removed in order to expose to view the hooked end of the plate.

A represents a railroad-rail; B, an ordinary fish-plate applied to opposite sides of the same; and C, the two transverse bolts, each provided on one end with the usual nut, D.

E represents my improved nut-locking plate. As shown in the drawings it consists of a flat plate of steel or iron having on one end an angular notch or recess, $a$, and in the opposite end, which is rounded on the exterior, an angular slot or opening, $b$, of sufficient size to admit one of the bolts. Near its middle the plate is notched or indented from one side, as shown at $c$, leaving between said notch and the opening $b$ a tongue or lip, $d$, the end of which is sprung or bent outward slightly from the sides of the plate.

In making use of the device one of the nuts is turned slightly backward in order to leave sufficient space between it and the fish plate for the admission of the nut-locking plate. The locking-plate is then applied in the manner represented by dotted lines in Fig. 2, being turned upside down and its hooked end engaged over and around the bolt C, between the loosened nut and the fish-plate. After being thus applied the plate is swung or turned over in the manner indicated by dotted lines in Fig. 2 and its notched end brought downward against the face of the adjoining nut. If the side of the nut stands in a vertical position, as in Fig. 2, the end of the fastening-plate will bear squarely against the same, as shown in said figure; but if the nut stands with its faces in an inclined position the corner or angle of the nut will enter and be retained by the notch $a$ of the fastening-plate. After the plate is thus applied the first-named nut is tightened up firmly against the plate, the tongue $d$ springing inward and permitting the corners of the nut to pass, but engaging behind the same, as clearly represented in Fig. 1, in such manner as to prevent the nut from unscrewing. It will be seen that when thus applied the plate is held firmly in place by the single nut, and that it in turn holds both the nuts from unscrewing. In particular cases it may be desirable to apply the plate in an inverted position with the notches or openings downward.

I am aware that many devices have been employed for securing nuts upon bolts, and that plates provided with notches, openings, elastic fingers, and other features have been made in in a great variety of forms. My device is peculiarly advantageous because of its exceeding cheapness and simplicity, and because it can be applied quickly and without removing the nuts to rails already in use.

Having thus described my invention, what I claim is—

1. The improved nut-lock consisting of the plate E, having the hook-shaped end, and the tongue $d$.

2. The plate E, constructed with the notches or openings $a$, $b$, and $c$ and the tongue $d$, as described and shown.

SAMUEL EDMOUR ST. ONGE CHAPLEAU.

Witnesses:
W. C. DUVALL,
NEWTON WYCKOFF.